United States Patent Office 3,351,352
Patented Nov. 7, 1967

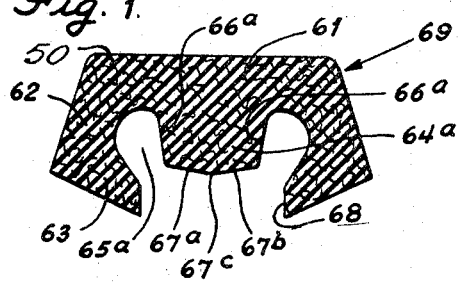
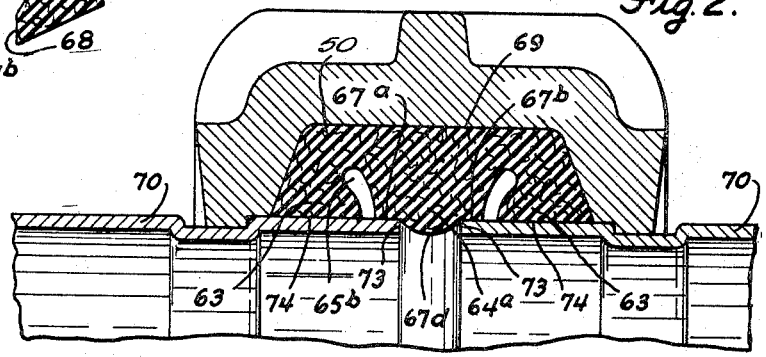
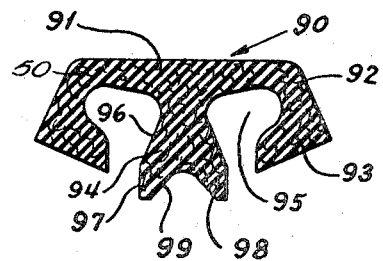
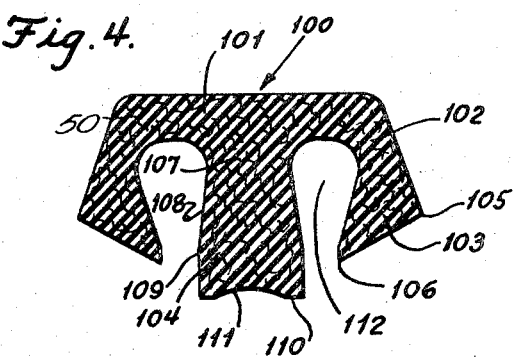
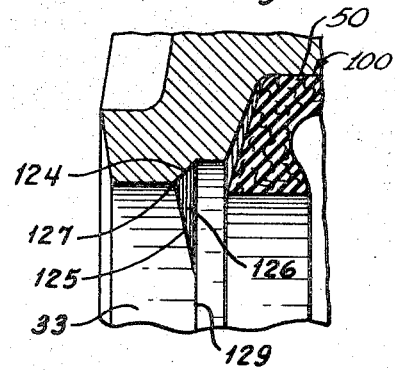

3,351,352
GASKET FOR PIPE JOINT
James Blakeley, Don Mills, Ontario, Canada, and Harry M. Sweet, East Hanover Township, Morris County, N.J., assignors to Victaulic Company of America, Union, N.J., a corporation of New Jersey
Original application Feb. 27, 1962, Ser. No. 177,137. Divided and this application July 7, 1965, Ser. No. 470,094
The portion of the term of the patent subsequent to Dec. 13, 1983, has been disclaimed
1 Claim. (Cl. 277—206)

This application is a division of application Ser. No. 177,137, filed Feb. 27, 1962, now abandoned. The invention disclosed herein relates to improvements upon the invention disclosed in application Ser. No. 456,674, filed May 18, 1965, now Patent No. 3,291,506 as the sole invention of James Blakeley.

This invention relates to the coupling of sections of pipe by the use of coupling housings engaging grooves in the pipe and is particularly concerned with improvements in the gaskets employed for sealing the joint between the pipe ends.

In the coupling of sections of pipe employing coupling housings bridging the gap between the pipe ends, which housings engage grooves in the pipe exteriors and contain pressure-responsive gaskets bridging the gap, the pressure of the fluid in the pipe is effective to assist in sealing the joint. In order that it may do so, it is common to employ gaskets of C-shape in cross section and to couple the pipes with the ends thereof spaced a small distance apart providing for flexibility in the joint, thus leaving a path between the interior of the pipes and the interior of the gasket for transmission of the pressure to the gasket. For certain piping services, however, of which the chemical, food, paper, and mining industries are examples, it is undesirable to allow the product flowing through the pipe to gather in the hollow of the gasket, commonly referred to as the "well." Also, there are situations where uninterrupted flow of the product through the pipe is desired, which situations may be the same as or different from those calling for the elimination of the well. Where such uninterrupted flow is a factor it is necessary to fill any recess which exists between the pipe ends.

For certain services the piping may be lined with a brittle material such as cement. The ends of the cement lining need to be protected from coming together during assembly or flexure of the joint so as to avoid chipping pieces off of it. For other services it is necssary, where a metal pipe is lined with material such as an anti-corrosive, to prevent the contents of the pipe from getting at the metal of the pipe where it is exposed at the joints.

The meeting of the foregoing needs and the introduction of other advantages into coupling of grooved end pipe by coupling housings clamped thereover are taken care of by the construction of the instant invention. The invention achieves its ends while employing standard coupling housings which are readily available and to a certain extent without the necessity of making any changes in standard pipe end preparation. It does so by the addition of integral leg-like members to C-shaped gaskets which members not only serve to close off the gasket cavity and thus prevent flow of fluids thereinto, or caviation, as it is called in the trade, but which at the same time provide for a filler piece for protecting the pipe ends, the linings thereof, and the metal in back of the lining, as may be desired. The invention also provides for the inclusion of suitable gasket filler elements to be carried by standard C-shaped gaskets and to serve substantially the same purpose as the integral legs.

The gasket improvements of the invention also insure the effecting of tight joints between sections of pipe, since in their positioning of the pipe ends a distance apart they resiliently serve to take up variations from the standard. In other words, they compensate for deviations from squareness of pipe ends and, in the "A" dimension, the distance between the pipe end and groove.

The invention also contemplates the combination of specially formed drawing surfaces on the key sections of the coupling housings with the resiliently deformable gasket elements extending between the pipe ends so that the drawing surfaces can draw the pipe ends toward each other and compress the resiliently deformable gasket elements therebetween at one and the same time.

It is, accordingly, an object of the invention to improve on the gaskets embodied in the coupling of grooved end pipe by means of clamping type coupling housings.

Another object is to prevent materials flowing through the pipe from getting into the cavity of the gaskets.

Still another object is to provide uninterrupted flow through pipes so coupled, although normal pipe ends be spaced somewhat apart.

Yet another object is to provide for the compressing or deforming of a novel resilient element extending between the pipe ends while drawing such pipe ends toward each other by the tightening of the coupling housings about the pipe.

A further object is to provide a novel resilient element acting as a shock absorber and thus protecting the linings of pipe from end fracture in the coupling of the pipe sections.

A still further object is to form a seal in an improved manner between ends of the sections of lined pipe coupled together so that the fluid within the pipe cannot come in contact with the metal of the pipe in back of the lining.

Still further objects are to accomplish the foregoing without any change in existing coupling housings with the exception of the inclusion of the novel gaskets of the invention.

Further and more detailed objects of the invention will in part be obvious and in part be pointed out as the description of the invention taken in conjunction with the accompanying drawing proceeds:

In that drawing:

FIG. 1 is a transverse section of a preferred form of gasket with integral insert.

FIG. 2 is a fragmentary section through a pipe joint in accordance with the invention showing, respectively, the gasket of FIG. 1 in place within the coupling housing.

FIG. 3 is a transverse section of another gasket with an integral annular member or tongue in accordance with the preferred form of the invention.

FIG. 4 is a similar view of a gasket of the same type as that of FIG. 3 but for use on pipe of somewhat larger diameter.

FIG. 5 is an enlarged fragmentary sectional view of related portions of gasket and coupling housing showing one of the drawing surfaces on one of the coupling housings.

Figure 6:
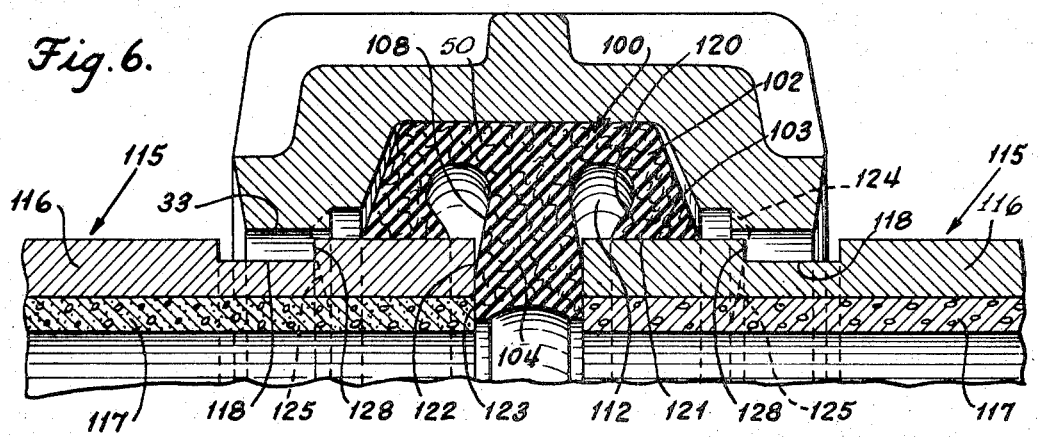
FIG. 6 is a fragmentary vertical sectional view of the gasket of FIG. 4 contained within a coupling housing element equipped with drawing surfaces assembled ready to be applied to pipe ends to be joined.

This invention represents improvements in certain aspects upon the pipe joints and gasketing thereof disclosed and claimed in the above Blakeley application Ser. No. 456,674 now Patent No. 3,291,506. The disclosure of such Blakeley application is herein incorporated in its entirety by reference.

An embodiment in accordance with the presently preferred concept of the invention is illustrated in FIGS. 1 and 2. This particular embodiment has particular applicability to thin wall pipe or tubing, whether unlined or provided with a thin lining. A further embodiment in accordance with the preferred concept for effecting the coupling of pipe of normal wall thickness in shown in FIGS. 6 and 7.

The gasket of FIG. 1, generally indicated at 69, has a base portion 61, side portions 62 and lip portions 63 of generally the same configuration and extent as the gasket shown in FIGS. 9 and 10 of Blakeley application Ser. No. 456,674 now Patent No. 3,291,506. Gasket 69 is provided with a central integral tongue 64a which extends downwardly from the base portion 61 into the gasket cavity dividing that cavity into two cavity portions 65a. The tongue 64a is, of course, annular, the same as the gasket, and is centered with regard to the center line of the gasket. Preferably the tongue 64a has radially outwardly inclining sides 66a and in relaxed state its inner surface 67a lies radially outwardly with respect to the ends 68 of the lips 63. The taper of the sides 66a is such that where they approach the surface 67a the distance between them is slightly greater than the greatest gap allowed between the pipe ends when the joint is completed following regular standards for the "A" dimensions and the coupling housing.

The tongue 64a in the gasket of FIG. 1 is somewhat wider for the same size of gasket than is the tongue 64 of FIG. 9 of Blakeley application Ser. No. 456,674 now Patent No. 3,291,506. Furthermore, the sides 66a on the tongue 64a do not converge in a radially inward direction to the extent of the sides 66 of the gasket 60 of such Blakeley application. Thus the innermost end of the tongue 64a made up by the two surfaces 67a and 67b, which incline somewhat toward the axis of the gasket and meet at a center line 67c, provide an inner end with an overall width somewhat greater than that of the end 67 of the gasket 60 of the above Blakeley application. This widening of the tongue and formation of the surfaces 67a and 67b has particular signficance as recognized from the showing in FIG. 2.

The manner in which the gasket of FIG. 1 accommodates itself to close and seal the joint between the pipe ends is illustrated in FIG. 2. Here two sections of thin walled pipe or tubing 70, which are shown unlined but may be lined with a thin liner as desired, are coupled together by means of a coupling housing in all respects similar to the coupling housing shown in and described in Blakeley application Ser. No. 456,674, now patent No. 3,291,506. Thus the key sections of the housing are seated within grooves rolled in the exterior of the pipes at the standard distance from the pipe end 73 and, accordingly, providing the standard surfaces 74 for engagement by the gasket. Once the gasket 69 is seated on the surfaces 74 adjacent the pipe ends its lips 63 will be swung toward each other while the portions 62 to lie flat on the surfaces 74. In this instance the nose of the tongue 64a will have been projected between the pipe ends 73 into contact with the end edge faces thereof. The nose portion of the tongue 64a serves as a buffer and a protection for the ends of the pipes, seals them against contact by the fluid within the pipe and also effects a seal against fluid getting up within the remaining portions 65b of the cavity portions 65a. Furthermore, should the pipe be lined as here indicated, the tongue would be of sufficient extent that its nose portion would extend down in opposition to the lining.

In this instance, as distinguished from previous ones, the cavity in the gasket is not completely filled. Instead it is divided into two cavities of considerably reduced volume. Nevertheless these are capable of receiving pressure should the seal provided between the pipe ends by the nose fail to hold. From the showing in FIG. 2 it will be seen that the purpose of gasket 69 is to provide a tongue materially wider than the gap between the pipe ends. This provides for a substantial seating of the tongue end on the exteriors of both sections of the pipe commencing at and extending for a substantial distance inwardly from the free ends of the pipe sections.

In FIG. 2 a small portion of the tongue 64a protrudes down between the ends 73 at 67d. This protrusion is merely sufficient to serve as a buffer against the pipe ends tending to come towards each other. At the same time it is sufficient of an inward projection to assist in maintaining a smooth flow through the pipe and thus to act as a deterrent against turbulence resulting from cavitation between the pipe ends.

The important additional function performed by this gasket is a substantial surface sealing effected where the annular portions of substantial width of the surfaces 67a and 67b engage the outer surfaces 74 of the pipes just inwardly from the ends 73 thereof. This provides tight sealing areas in advance of the seals effected by the lips 63. Should the sealing at 67a or 67b fail under pressure, there still remains small gasket cavities 65b to receive fluid under pressure which will act downwardly on the lips 63 forcing them tightly down against the pipe surfaces.

Though the gasket 69 has been shown as applied to unlined pipe in FIG. 2, it is, of course, to be appreciated that if the pipe, and particularly the pipe in addition to its lining, is thin enough and the tongue 64a is properly formed, the projection 67d can be pronounced enough to seal against both the lining and the metal ends 73 of the pipe.

The commercial embodiment in keeping with the presently preferred concept of the invention is shown in FIGS. 3–7 in addition to the showing in FIGS. 1 and 2. FIGS. 3 and 4 show integral coupling gaskets having integral downwardly extending intermediate members referred to herein as "legs" or "tongues." The distinction between the gaskets of FIGS. 3 and 4 merely reside in the fact that they are made for coupling pipes of different diameters. As a non-limiting illustration, the gasket of FIG. 3 is presently preferred for use in the coupling of pipes in the size range between 1¼" and 3", while that shown in FIG. 4 is preferred for the coupling of pipes having diameters of 4" though 7", though again this range is for illustrative and not limiting purposes.

Considering the detail of the gasket generally shown at 90 in FIG. 3, it will be seen that it has a base portion 91, side portions 92 extending downwardly and outwardly therefrom, as viewed in FIG. 3, and lip portions 93 extending downwardly and inwardly from the portions 92. With regard to these lip portions, the important thing to note is that they are shorter than those of the standard C-shaped gasket, the purpose of which will be apparent from the discussion of FIGS. 4, 6, and 7 to follow.

The downwardly extending integral annular tongue 94 of the gasket 90 differs from the tongue 64 of the gasket of FIGS. 9 and 10 of Blakeley application Ser. No. 456,674 in several respects. One is that it extends down through and out beyond the cavity portions 95 and in doing so extends down below the lips 93. Actually when considered as an annulus this extension would be radially inwardly with respect to the lips 93, through this appears to fit the term downwardly as the cross section of FIG. 13 is viewed.

Another important difference in the construction of the tongue 94 as against that shown at 64 of such Blakely application is that instead of extending toward each other in their radially inward direction, the sides 96 of the tongue 94 diverge as they extend away from the base 91, thus leaving the smallest cross section where they depart from that base. This divergence continues throughout most of the extent of the tongues, terminating in short inward portions 97 adjacent the innermost portions of the tongues. Finally, it is to be noted that the inner end 98 of the tongues is rather deeply concaved transversely as seen at 99.

Figure 7:
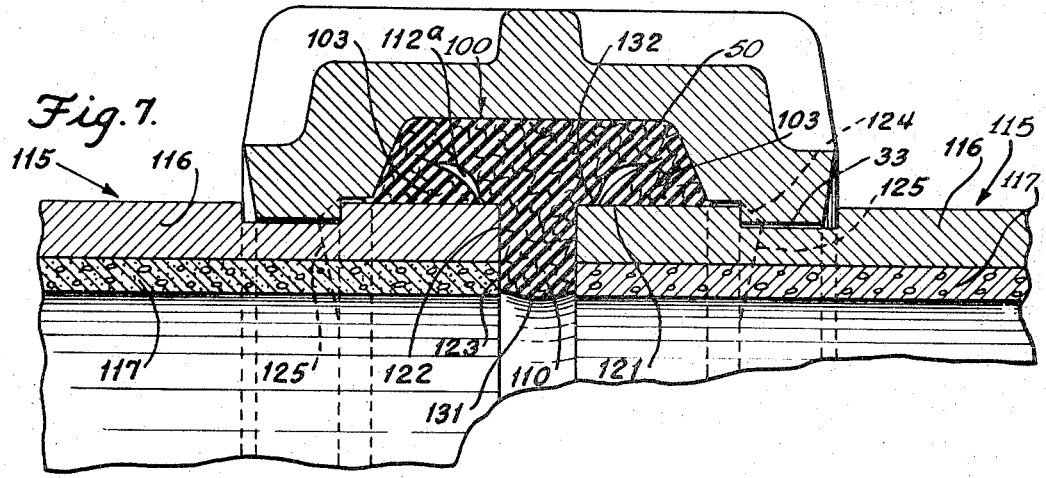
FIG. 7 is a similar view showing the joining completed.

Turning now to the gasket of FIG. 4 and the application thereof in the coupling of pipe sections as shown in FIGS. 6 and 7, this gasket generally shown at 100 has a base portion 101, downwardly and outwardly extending side portions 102, downwardly and inwardly extending lip portions 103, and integral intermediate tongue or leg portion 104. Again the lip portions 103 between their inner and outer extremities 105 and 106 are shorter than those normally employed for standard C-shaped gaskets of comparable size. The leg 104 again has its smallest cross section at 107 where it departs from the base 101 and has sides 108 which diverge in a direction away from that space, which divergence continues to a position at 109 closely adjacent the inner end 110 of the tongue. This inner end as readily seen is positioned a substantial distance radially inwardly with respect to the innermost point 106 of the lips 103. Again the inner end 110 is transversely concaved at 111, though not as deeply so as is the surface 99 of the FIG. 3 form. Finally, it is to be noted that the tongue 104 separates the interior of the gasket into two annular bulbous cavities 112, which have a greater extent radially but a somewhat lesser extent axially than do the cavities 95 of the FIG. 3 form.

It is quite obvious that this gasket, that is, the gasket of FIG. 4, as well as that of FIG. 3, being of integral construction, are of the same material throughout. This material, of a rubber-like nature, will necessarily have adequate resilience for effective coupling and be resistant to chemical or abrasive action of materials flowing through the pipe. Besides resistance to abrasive and/or chemical action, the gasket of FIGS. 3 and 4, as well as the integral gaskets or separate tongues of the previous figures, may have included in the body of them an amount of nylon flock sufficient to offer resistance to the cutting of tongue or leg 104 by the pipe ends. Such nylon flock is shown incorporated in the gasket of FIGS. 1–7, inclusive, such flock consisting of a plurality of short fibers 50 disposed in random orientations in the rubber-like material of the gaskets. This nylon flock would be suitably dispersed throughout the body of the gasket material. Other suitable fibers can be substituted for nylon.

FIGS. 6 and 7 illustrate the coupling of sections of pipe 115 together employing the coupling gasket of FIG. 4. The pipe 115 is of normal thickness of metal 116 and, as illustrated, has a concrete lining 117. It is, of course, to be understood, however, that the pipe could be of the thin wall type with grooves rolled therein instead of the cut grooves 118 as shown, so whether the pipe be of thin or thick wall construction, the lining could be of various plastics or other chemically resistant materials in place of the concrete illustrated. In such instance the lining could be somewhat thinner and particularly if the pipe wall were thinner also the radial extent of the tongue 104 could be adjusted accordingly to prevent it from projecting into the flow of fluid through the pipe.

The coupling housings shown in FIGS. 5, 6, and 7 herein are those shown and described in Patent No. 3,054,629 of Edward W. Piatek, which is owned by applicants' assignee. In other words, they are standard coupling housings with the exception of the special drawing surface.

Considering now the showing in FIG. 6, it will be apparent that with the gasket 100 positioned within the gasket channel of the coupling housing, the gasket 100 fills that channel as do the gaskets previously described. The gasket 100 having been seated around the pipe ends, its lips 103 have been bent inwardly and upwardly about the section 102 so that the lip surface 120 seats flush on the gasketing surfaces 121 of the pipes adjacent their ends. Otherwise, however, the gasket 100 is uncompressed so that its tongue 104 extends down between the pipe ends overlapping the metal portion at 122, as well as part of the radial extent of the lining at 123. However, it will be seen that the outer radial portion of the metal 122 is not engaged by the side wall of the tongue 104, since that side wall diverges away from the surface 122. It is further to be noted that the gasket cavities 112 have only been closed up to a small extent and that due to the inward and upward turning of the gasket lips 103. At this stage also it is to be noted that the key sections 33 of the coupling housings have not yet been engaged with the grooves 118, since the pipe ends, and consequently those grooves, are too far apart to permit this.

From the dotted line showing at 124, 125 in FIG. 6 it is to be seen that the drawing surface 126 is just being brought into position where its axially outermost corner 127 (see FIG. 5) is aligned slightly outwardly of the innerside surface 128 of the groove 118. From this point on as the bolts are tightened drawing the sections of the coupling housing together in order to complete the cylinder about the pipe, the surface 126 being inclined toward the center of the coupling housing and toward the normal radial plane of the inner surface 129 of the key section 33 acts to draw the pipe sections 115 toward each other endwise. As this action is continued, the ends of the pipe are brought toward each other and the gasket is compressed, or distorted, which has the effect of lengthening and thinning out the tongue 104 until its inner end 110, reversing the concave form which it has in the relaxed state, ends up with the convex form as seen at 131 in FIG. 7. Also, it is seen that the cavities 112 are substantially closed up, leaving merely small cavity portions 112a still located, however, in position to receive pressure and impart it to the lips 103. Other important aspects are that the tongue 110 now extends throughout almost all, if not all, of the thickness of the pipe 116 and its lining 117. Furthermore, this portion between the pipe ends 122 and 123 is tightly compressed therebetween so normally effects a tight seal against leakage of the contents of the pipe up into the gasket cavities 112a. Assisting in the making of this seal is the outward bulging of the now deformed sides 108 at the position 132, just around onto the beginning of the pipe surface 121. Thus this gasketing in effect presents three different sealing aspects. The first by the compressing of the tongue 104 between the pipe ends, the second by the bulge formation 132, and, finally, by the gasket lips 103 acting on the surface 121, which would certainly act tightly if pressure sufficient to pass the first two seals reached the cavity 112a.

The drawing surfaces 126 are at each end of each segment of the coupling housing and on each of the key sections thereof. Thus, though they take up only a small portion of the inner surfaces of the key sections, they produce a strong drawing action to draw the pipe ends toward each other. The formation of the gaskets in FIGS. 3 and 4 is such as to cooperate with this drawing action. This cooperation is achieved through the direction of inclination of the sides 96 and 108 of the tongues of those gaskets. Having the inclination that they do these, as seen by the showing in FIG. 6, are not fully engaged with the pipe ends and thus do not put up too much resistance against the drawing together of those ends, until the drawing surfaces 126 have begun to take hold. The surfaces 96 are on a greater incline than those at 108, because it has been found that in the smaller sizes greater overall compression on the leg 94 is required to effect the coupling than is the case in the larger sizes as illustrated in FIG. 4. This also accounts for the deeper recess 99 in the gasket in FIG. 3.

The use of gaskets as illustrated in this preferred embodiment of the invention with coupling housings having drawing surfaces, as seen at 126, has been found commercially to be most effective for the coupling together of sections of pipe, particularly those carrying materials which might otherwise attack the metal of the pipe and whether the pipe be lined or unlined.

It is to be noted that the sections of pipe 115 shown in FIGS. 6 and 7 are provided with a lining 117, which would be of suitable material to resist action of the contents of the pipe. It is further to be noted that the inner face 131 of the tongue portion 110 (FIG. 7) is substantially flush with the inner surface of the linings 117. This is the preferable condition, since it assures uninterrupted flow of the fluid through the pipe.

Returning to the application of the housing couplings, they themselves, if of the form shown in FIGS. 5-7 hereof, will cause the pipe ends to be drawn towards each other as the gap between the coupling segments is reduced by the tightening of the clamping bolts. Otherwise the pipe sections may be drawn together by use of a pipe jack so that coupling housings devoid of the FIG. 5 feature can, though with difficulty, be seated with their key sections in the grooves 118. This drawing together is necessary, since the tongue 104 (FIG. 6) is a little wider than the largest gap permissible between the pipe ends and since it is desired to form a tight seal between those ends, not only protecting them against contact with the fluid within the pipe but also preventing ingress of fluid from the pipe into the cavity of the gaskets 90, 91 should any cavity still exist and, at the same time, eliminating any interruption in the path along the pipe interior such as would be likely to disturb the flow. It would also be apparent that as the pipe ends are drawn together the tongue portion of the gasket will be squeezed and being resilient it will seek to flow where it can. Thus if any cavity remains within the gaskets 16 that would be filled while otherwise, so long as the parts are properly proportioned, the tongue portion will flow radially inwardly bringing its inner surface 131 (FIG. 7) generally into alignment with the interior of the linings 117.

The combination just described achieves all of the objects of the invention but does so in a simple straightforward manner and, what is important to the industry, enables it to be done without the necessity of adding any special inventory beyond that which they normally carry, with the exception of the gasket 90 (FIG. 3) or 100 (FIG. 4).

The tongue of the gasket is intended to form a tight seal between the pipe ends. It is also intended to maintain that seal though there be a certain amount of axial movement of the pipe sections due to expansion or contraction, or other movement resulting in deflection of one section with respect to the other.

It will also be apparent that the resiliency of the tongue portion of the gaskets, when the pipe ends are brought together and at other times, will protect the linings 117 from being broken or chipped. Also the presence of the compressed material of the tongue imparts rigidity to the joint, which would not be realized if the tongue were lacking. Finally, should the tongue fail in any way to make a tight seal, the main gasket body would stand in back of it to prevent leakage. This is so, because as initially applied to the pipes the gasket makes a tight seal and that seal is enhanced whenever pressure builds up in its cavity to force the lips 93 or 103 down against the surfaces 121 of the pipes (FIGS. 3, 4, 6, and 7).

It should be noted that in FIGS. 2 and 7 hereof the tongue of the gasket when fully assembled and tightened in operative relationship with pipe joined by the coupling is deformed so as sealingly to engage the outer surfaces of the pipes throughout substantial axial distances. Thus in FIG. 2 a portion 67a of the tongue of substantial length sealingly contacts the peripheral surface 74 of the pipes 70 at their ends. In FIG. 7 a portion 132 of the tongue of substantial length sealingly contacts the peripheral surface 121 of the pipes 115 at their ends. Such engagement of the tongues of the gaskets with the peripheral surfaces of the pipes thus provides a third seal between the gasket and the pipes, the others being the engagement between the lips of the gasket and the peripheral surfaces of the pipes, and the engagement between the ends of the pipes and the sides of the tongue.

Though in the foregoing description and accompanying drawing a preferred and several modified forms of the invention have been shown and described, it is, of course, to be understood that this showing and description is for illustrative and not limiting purposes. One skilled in the art might well devise further variations and modifications of the structures and assemblies embodied in the examples given without departing from the spirit and scope of the invention.

It is thus to be understood that the intention with regard to all matter contained in the above description or shown in the accompanying drawing is that it shall be interpreted as illustrative and not in a limiting sense.

Having described our invention, what we claim as new and desire to secure by Letters Patent is:

In gasket construction for the coupling of grooved end pipe, a continuous angular gasket member formed of resilient material and of E-shape when viewed in transverse section, said gasket having a base portion, radially inwardly extending side portions extending from the sides of said base portion, lip portions extending toward each other from the radially inner portion of said side portions, said lip portions terminating in spaced apart faces and an integral annular tongue portion extending radially inwardly from said base portion, the sides of said tongue portion being spaced from said side portions and from said lip portions thereby providing annular cavities within said gasket at either side of said tongue portion, said tongue portion when said gasket is in relaxed position extending radially inwardly between and beyond the inner ends of said lip portions, said lip portions when said gasket is in relaxed position being inclined inwardly toward the axis of the annulus of said gasket, and said lip portions, when said gasket is in compressed condition, being swung upwardly about said inner portions of said side portions and lying in a cylindrical zone concentric with respect to the axis of said gasket, with said tongue portion extending radially inwardly between and beyond the inner ends of said lip portions and said gasket cavities being materially reduced in volume.

References Cited

UNITED STATES PATENTS

| 2,805,872 | 9/1957 | Routh | 285—369 X |
| 3,049,385 | 8/1962 | Smith. | |
| 3,129,920 | 4/1964 | Sillwagoa | 285—373 |
| 3,134,612 | 5/1964 | Glasgow | 285—112 |
| 3,291,506 | 12/1966 | Blakeley | 285—112 |

FOREIGN PATENTS

| 1,207,151 | 2/1960 | France. |

EDWARD C. ALLEN, *Primary Examiner.*

THOMAS F. CALLAGHAN, CARL W. TOMLIN,
*Examiners.*

R. GIANGIORGI, *Assistant Examiner.*